United States Patent [19]

Martin

[11] 3,897,242

[45] July 29, 1975

[54] USE OF 1-(3-CHLORO-4-METHYLPHENYL)-3,3-DIMETHYLUREA IN WHEAT AND BARLEY CROPS

[75] Inventor: Henry Martin, Basel, Switzerland

[73] Assignee: Ciba-Geigy AG, Basel, Switzerland

[22] Filed: Jan. 17, 1974

[21] Appl. No.: 434,146

Related U.S. Application Data

[63] Continuation-in-part of Ser. No. 196,790, Nov. 11, 1971, abandoned, which is a continuation-in-part of Ser. No. 797,251, Feb. 6, 1969, abandoned.

[52] U.S. Cl. ................................. 71/120; 71/120
[51] Int. Cl.$^2$ ........................................... A01N 9/20
[58] Field of Search ................................... 71/120

[56] References Cited
UNITED STATES PATENTS

| | | | |
|---|---|---|---|
| 2,655,445 | 10/1953 | Todd | 71/120 |
| 3,079,244 | 2/1963 | Scherer et al | 71/120 |

FOREIGN PATENTS OR APPLICATIONS

| | | | |
|---|---|---|---|
| 1,497,868 | 9/1967 | France | 71/120 |

OTHER PUBLICATIONS

Michiels et al., "Etude Comparative de Quatre Herbicides, etc.," (1956), Chim. & Ind. 78, pp. 500–504, (1957).

Sumich, "New Developments with Linuron," (1966), CA 66, No. 54447g. (1967).

Hauf et al., I, "Effect of Different Soil Properties and Moisture etc.," (1967), CA 69, No. 66364c. (1968).

Hauf et al., II, "Effect of Various Soil Props. and Moisture, etc.," (1967), CA 69, No. 42945s. (1968).

Primary Examiner—Glennon H. Hollrah
Attorney, Agent, or Firm—Frederick H. Rabin

[57] ABSTRACT

The use of 1-(3-chloro-4-methylphenyl)-3,3-dimethylurea as selective herbicide for the control of weeds in wheat and barley crops is disclosed.

2 Claims, No Drawings

USE OF 1-(3-CHLORO-4-METHYLPHENYL)-3,3-DIMETHYLUREA IN WHEAT AND BARLEY CROPS

CROSS-REFERENCE TO RELATED APPLICATIONS

This is a continuation-in-part of our copending application Ser. No. 196,790, filed Nov. 11, 1971, which is itself a continuation-in-part of our application Ser. No. 797,251 filed Feb. 6, 1969, both now abandoned.

DETAILED DISCLOSURE

It is known from U.S. Pat. No. 2,655,445, that various N-methyl-N-alkyl-N'-halophenylurea derivatives are suitable as herbicides, particularly as a total herbicide against grasses and other weeds usually growing on railway embankments. Some of these herbicides can be employed also in the cultivation of useful crops; a selective action is described, for 1-(4-chlorophenyl)-3,3-dimethylurea in cotton crops. Mentioned in this patent, as an illustrative compound, is 1-(3-chloro-4-methylphenyl)-3,3-dimethylurea, for which, however, no selective fields of application are described.

Other publications teach that, with the observance of special precautionary measures, various appropriate urea derivatives may indeed be used to a limited extent in grain crops, but these agents have not been able fully to satisfy all herbicidal requirements, being suitable mainly on dicotyledonous crops.

Further, in 1967, French Pat. No. 1,497,868 taught that 1-(3-chloro-4-methylphenyl)-3,3-dimethylurea, with regard to selectivity in grain crops, behaved like the well known generally non-selective compounds fenuron (1-phenyl-3,3-dimethylurea), monuron (1-(4-chlorophenyl)-3,3-dimethylurea) and diuron (1-(3,4-dichlorophenyl)-3,3-dimethylurea).

In the search for suitable fields of application for 1-(3-chloro-4-methylphenyl)-3,3-dimethylurea, it seemed therefore purposeless to carry out tests in grain crops. Therefore, in the case of this long-known active substance, experts for years avoided carrying out the usual corresponding routine tests; and the active substance was thus not included in routine tests being conducted in numerous places to establish the most suitable known urea derivative for application in grain crops. The commercial possibilities for this compound appeared to lie, if anywhere, in other directions.

Surprisingly it has now been discovered that the data in French Pat. No. 1,497,868 are incorrect to the extent that both wheat and barley crops do in fact constitute a suitable field of application for 1-(3-chloro-4-methylphenyl)-3,3-dimethylurea. In tests carried out in spite of the prevailing prejudice, it was precisely in these crops that the compound proved superior even to all known compounds, controlling, with ample selectivity with respect to the mentioned varieties of grain, both dicotyledonous and, in particular, monocotyledonous weeds, with relatively small amounts of active substance.

Weeds that can be especially well controlled are those of the genera Lolium, Alopecurus, Poa, Apera and Avena. Application of the compound can be effected both pre-emergently and post-emergently. The applied amounts per hectare under field conditions, depending on the type of soil, are, e.g., 0.5 to 4.0 kg. preferably 0.5 to 3.5 kg of active substance. The application of the active substance according to the invention in applied amounts of, for example, 0.5, 1.0, 1.5, 2.0, 3.0 and 4.0 kg per hectare produced a superior action against various weeds without causing any harm to wheat and barley crops.

The invention thus relates to the use of 1-(3-chloro-4-methylphenyl)-3,3-dimethylurea as a selective herbicide for the control of weeds in wheat and barley crops.

1-(3-chloro-4-methylphenyl)-3,3-dimethylurea has the formula

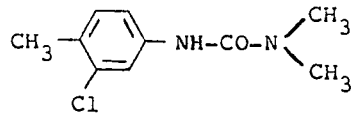

It is produced by methods known per se, e.g., by the reaction of (3-chloro-4-methyl)-phenyl-isocyanate with dimethylamine, if necessary in the presence of catalytic amounts of a tertiary amine, such as, e.g., triethylamine or triethylenediamine.

1-(3-Chloro-4-methylphenyl)-3,3-dimethylurea is used in various ways for weed control according to the invention. It can thus be made up into agents applied as emulsions, dusts, granulates, etc.. The conversion of the active substance according to the invention into the most favourable preparations for application is a part of prior art, i.e., it forms a part of the general knowledge of the experts concerned. The preparation of some such forms of application is described in the following. Parts are expressed as parts by weight.

A. Dust

Equal parts of 1-(3-chloro-4-methylphenyl)-3,3-dimethylurea and precipitated silicic acid are finely ground. The ground substance is then mixed with kaolin or talcum to obtain dusts having an active-substance content preferably of 1 to 6%.

B. Wettable powder

The following components, for example, are mixed and finely ground in the preparation of a wettable powder:

| | |
|---|---|
| 50 | parts of active substance according to the present invention, |
| 20 | parts of Hisil (highly adsorptive silicic acid), |
| 25 | parts of bolus alba (kaolin), |
| 3.5 | parts of the reaction product from p-tert.-octylphenol and ethylene oxide, |
| 1.5 | parts of the sodium salt of 1-benzyl-2-stearyl-benzimidazole-6,3'-disulphonic acid. |

C. Emulsion concentrate

The active substance can be made up also as an emulsion concentrate as follows:

| | |
|---|---|
| 20 | parts of active substance, |
| 70 | parts of xylene, and |
| 10 | parts of a mixture of a reaction product of an alkylphenol with ethylene oxide and calcium-dodecylbenzenesulphonate | are mixed together. The mixture is diluted with water to obtain a spraying emulsion of the desired concentration.

The use of 1-(3-chloro14-methylphenyl)-3,3-dimethylurea in wheat and barley crops provide excellent control of weeds, particularly the most troublesome seed-propagated dicotyledonous weeds. Striking results are achieved against, for example, fox-tail grass, silky bent-grass, annual meadow grass, ray grass and wild oat.

The invention is best illustrated and understood by reference to the following examples.

EXAMPLE 1

Investigation of the possibility of the selective use of known herbicidally effective phenylureas in grain crops by reduction of the amount applied.

a. Test procedure

Seeds of weeds and/or cultivated plants are sown in pots filled with soil. The seeds are covered by a ca. 1.5 cm deep layer of soil. It is only on this surface of the soil that the herbicides are sprayed, in the case of pre-emergence application, 1 day after sowing, with applied amounts, calculated in kg per hectare, in 400 to 600 litres of water per hectare. By regular watering of these pots, the herbicidal agent is dispersed down into the lower layer of germinating seed. The effect of the adsorbtive capacity of the agents in the tests is governed, as in the field, by their physical properties.

In the case of post-emergence application, the plants are treated in the one- to two-leaf stage 12 days after sowing. With applied amounts calculated in kg per hectare, the herbicides are sprayed out in 400 to 600 litres of water per hectare. As under practical conditions, a portion of the applied amount reaches, with this technique, the surface of the soil. This portion is washed into the root zone by regular watering.

The active substances are applied in amounts of 4 kg, 2 kg and 1 kg per hectare, in the form of wettable powders. An evaluation is made after 20 days on the basis of a scale of values from 1 to 9:

```
    1 = no action, complete compatibility,
    9 = complete destruction of crops and weeds,
  2 - 4 = damage which diminishes as growth continues,
  5 - 8 = severe damage leading to gradual dying off.
   1/2 = 1st number — pre-emergence
         2nd number — post-emergence
    AS = active substance.
``` b. Sown genera of weeds and cultivated plants
Alopecurus, poa, wheat and barley.
c. Employed active substances:
1. 1-(4-chlorophenyl)-3,3-dimethylurea (MONURON),
2. 1-(3,4-dichlorophenyl)-3,3-dimethylurea (DIURON),
3. 1-phenyl-3,3-dimellyl (FENURON).

| d) Results: | kg AS/hec. | Alopecurus | Poa | Wheat | Barley |
|---|---|---|---|---|---|
| MONURON | 4 | 9/9 | 9/9 | 9/9 | 9/9 |
|  | 2 | 9/9 | 9/9 | 9/9 | 9/8 |
|  | 1 | 8/9 | 8/9 | 9/9 | 7/7 |
| DIURON | 4 | 9/9 | 9/9 | 9/9 | 9/9 |
|  | 2 | 9/9 | 9/9 | 9/9 | 9/9 |
|  | 1 | 7/8 | 9/9 | 6/9 | 8/6 |
| FENURON | 4 | 8/8 | 9/9 | 9/9 | 9/9 |
|  | 2 | 8/8 | 9/9 | 6/7 | 6/8 |
|  | 1 | 6/7 | 8/7 | 8/7 | 4/5 | e. Conclusion

A reduction of the applied amounts provides no possibility of the selective use in grain crops of the herbicidally active phenylureas MONURON, DIURON and FENURON, which are structurally closely related to the compound 1-(3-chloro-4-methylphenyl)-3,3-dimethylurea suggested, according to the present invention, as a selective herbicide for grain crops. It is not possible to ascertain effective amounts of these compounds which would, at the same time, be tolerated by wheat or barley.

EXAMPLE 2

Investigation of the biological properties of the compound suggested according to the invention: 1-(3-chloro-4-methylphenyl)13,3-dimethylurea, and of its isomer: 1-(4-chloro-3-methylphenyl)-3,3-dimethylurea, with applied amounts of 4 kg per hectare. Test procedure, sown genera of weeds and cultivated plants otherwise as in Example 1.

| a) Results: | kg AS/hect. | Alopecurus | Poa | Wheat | Barley |
|---|---|---|---|---|---|
| 1-(3-chloro-4-methylphenyl)-3,3-dimethyl-urea | 4 | 9/9 | 9/9 | 8/8 | 8/8 |
| 1-(4-chloro-3-methylphenyl)-3,3-dimethyl-urea | 4 | 9/9 | 9/9 | 9/9 | 9/9 | b. Conclusion

As to be expected, the examined compounds with applied amounts of 4 kg of active substance per hectare exhibit a herbicidal action identical to that confirmed in the case of the closely related known total herbicides MONURON, DIURON and FENURON.

EXAMPLE 3

Examination of the biological properties of the compound suggested according to the invention: 1-(3-chloro-4-methylphenyl)-3,3-dimethylurea, and of its isomer: 1-(4-chloro-3-methylphenyl)-3,3-dimethylurea, in parallel dilution stages. Test procedure and sown genera of weeds and cultivated plants analogous to Example 1. The framed index numbers 1./2. indicate areas of good action and compatibility.

| a) Results | kg AS/hect. | Alopecurus | Poa | Wheat | Barley |
|---|---|---|---|---|---|
| 1-(3-chloro-4-methylphenyl)-3,3-dimethyl-urea | 4 | 9/9 | 9/9 | 8/8 | 8/8 |
|  | 2 | 9/9 | 9/9 | 4/7 | 7/7 |
|  | 1 | 9/9 | 9/9 | 3/4 | 4/4 |
| 1-(4-chloro-3-methylphenyl)-3,3-dimethyl-urea | 4 | 9/9 | 9/9 | 9/9 | 9/9 |
|  | 2 | 9/9 | 9/8 | 9/7 | 9/7 |
|  | 1 | 9/9 | 9/7 | 9/6 | 9/5 | b. Conclusion

Contrary to expectations according to the results of tests in Examples 1 and 2, it is surprisingly shown that the phytotoxic action on wheat and barley of the compound of the invention — in contrast to that of its isomer — decreases to such an extent with a reduced concentration that selectivity in these grain crops occurs, with an unchanged degree of effectiveness against weeds.

EXAMPLE 4

Further examination of the compound suggested according to the invention: 1-(3-chloro-4-methylphenyl)-3,3-dimethylurea, in a field test similar to practice, i.e. under natural conditions, using as a comparison the compound 1-(3-chloro-4-methoxyphenyl)-3,3-dimethylurea according to French Pat. No. 1,497,868.

The applied amounts of 1-(3-chloro-4-methoxyphenyl)-3,3-dimethylurea were fixed, according to the official recommendations (as recorded), at in general between 3.2 kg and 4.4 kg of active substance per hectare (depending on the type of soil).

pre = pre-emergence
post = post-emergence
%-figures - weeds: % control compared with (untreated) control
useful crops: % yield compared with (untreated) control
Index numbers - 1 = 100 % action on weeds, no action on
cultivated crops
9 = no action on weeds, 100 % action on
cultivated crops
Numbers above 4 mean, for the purpose of weed control, insufficient action of the test substance.

Employed active substances:

I. 1-(3-chloro-4-methylphenyl)-3,3-diimethylurea according present invention,
II. 1-(3-chloro-4-methoxyphenyl)-3,3-dimethylurea according to French Pat. No. 1,497,868.

Application for I and II in the form of wettable powder
Results:

a. Fields naturally contaminated by Alopecurus and Avena:

| cultivated crop: | winter wheat |
| variety: | Joss Cambier |
| country: | Great Britain |
| soil: | loamy clay |
| stage: | 4th leaf — commencement of tillering |

| AS | kg AS/ hect. | Alopecurus % control | Avena fatua % control | Yield % |
| --- | --- | --- | --- | --- |
| I Post | 2.0 | 73 | 68 | 124 |
|  | 2.4 | 85 | 78 | 135 |
|  | 3.2 | 97 | 95 | 152 |
| II Post | 4.4 | 87 | 89 | 131 |
| Control |  | 0 | 0 | 100 |

Comments.

To obtain roughly comparable results in weed control, the applied amount of I need be only about half of the comparative substance II. Better yield increases were obtained with lower applied amounts.

b. Naturally contaminated fields:

| cultivated crop: | winter wheat |
| variety: | Splendeur |
| location: | Chanceau, France |
| soil: | sandy loam |

-Continued

| AS | kg AS/hect. | Alopecurus/Poa Index | Yield % |
| --- | --- | --- | --- |
| I Pre | 2.0 | 3 | 126 |
|  | 3.0 | 2 | 115 |
| II Pre | 4.0 | 5 | 96 |
| I Post | 2.5 | 2 | 120 |
| II Post | 4.0 | 2 | 114 |
| Control |  | 9 | 100 |

Comments.

Greatly improved weed action and increase in yield is obtained by application of I in small amounts. The applied amount of the comparative substance II in this test corresponds to the official recommendations.

c. Field naturally contaminated by Alopecurus:

| cultivated crop: | winter wheat |
| variety: | Capelle |
| location: | Bourdigny, Switzerland |
| soil: | sandy loam |

| AS | kg AS/hect. | Alopecurus % stage F | Yield % |
| --- | --- | --- | --- |
| I Post | 2.4 | 68 | 196 |
| II Post | 4.0 | 33 | 156 |
| Control |  | 0 | 100 |

Comments.

In this extreme test with large weeds, compound I applied in amounts approximately half as great as those of the comparative substance II produces a drastic improvement in weed action and increase in yield.

d. Field naturally contaminated by Alopecurus:

| cultivated crop: | winter wheat |
| variety: | Champlein |
| location: | Essertines Switzerland |
| soil: | clayey loam |

| AS | kg AS/hect. | Alopecurus % | Yield % |
| --- | --- | --- | --- |
| I Post | 2.0 | 88 | 213 |
|  | 2.4 | 96 | 222 |
|  | 3.0 | 99 | 229 |
| II Post | 4.0 | 49 | 156 |
| Control |  | 0 | 100 |

Comments.

Great increase in superiority of I over comparative substance II is shown with respect to applied amount, weed control and increase in yield.

e. Field naturally contaminated by Alopecurus:

| cultivated crop: | winter barley |
| variety: | Dura |
| location: | Heilbronn, Germany |
| soil: | clay |

| AS | kg AS/hect. | Alopecurus Index | Yield % |
| --- | --- | --- | --- |
| I Post | 1.6 | 3 | 123 |
|  | 3.2 | 2 | 123 |
| II Post | 3.2 | 3 | 123 |
| Control |  | 9 | 100 |

Comments:

Only 50% of the applied amount of substance II is required to obtain with I the same action with respect to weed destruction and increase in yield f. Field naturally contaminated by wild oat (Avena fatua):

| cultivated crop: | winter wheat |
| --- | --- |
| stage: | end of tillering |
| variety: | Moisson |
| location: | Vienne, France |
| soil: | lime-containing loam |

| AS | kg AS/hect. | Avena fatua Index | Wheat Index |
| --- | --- | --- | --- |
| I Post | 3.0 | 2 | 2 |
|  | 3.6 | 1.5 | 2.5 |
| II Post | 4.0 | 2.5 | 3.0 |
| Control |  | 9 | 1.0 |

Comments:

Substance I according to the invention exhibits, with a substantially lower applied amount, a better action against wild oat (Avena fatua) and, at the same time, better compatibility, than substance II, with the wheat crop.

g. Field naturally contaminated with wild oat (Avena fatua) and Alopecurus:

| cultivated crop: | winter wheat |
| --- | --- |
| stage: | end of tillering (crop and weeds) |
| variety: | Capitol |
| location: | Vienne, France |
| soil: | lime-containing loam |

| AS | kg AS/hect. | Avena fatua Index | Alopecurus Index | Cultivated crop index |
| --- | --- | --- | --- | --- |
| I Post | 3.0 | 2 | 1 | 2 |
|  | 4.5 | 1 | 1 | 2 |
| II Post | 4.0 | 6 | 2 | 1 |
|  | 6.0 | 5 | 1 | 2 |
| Control |  | 9 | 9 | 1 |

Comments:

With a small amount of active substance per hectare, substance I is more effective than the comparative substance II. This applies too in the case of the greatly increased dosage of the comparative substance II.

h. Field naturally contaminated by Alopecurus and Lolium:

| cultivated crop: | winter barley |
| --- | --- |
| stage: | middle of tillering |
| variety: | Noelle |
| location: | Neuilly le Sierre, France |
| soil: | stony clay soil |

| AS | kg AS/hect. | Avena sterilis Index | Cultivated crop Index |
| --- | --- | --- | --- |
| I Post | 2.4 | 4 | 1 |
|  | 3.2 | 3 | 1 |
| II Post | 4.0 | 8 | 1 |
| Control |  | 9 | 1 |

Comments:

Substance I according to the invention produces, with about half the amount applied compared with the amount of comparative substance II, a clearly better action.

i. Field naturally contaminated by Avena sterilis:

| cultivated crop: | winter wheat |
| --- | --- |
| stage: | middle of tillering |
| variety: | Mara |
| country: | Italy |
| soil: | loam |

Comments:

A surprisingly good action is obtained with the applied amount of the substance according to the invention being half that of the comparative agent. The comparative substance II is practically ineffective.

k. Field of winter wheat with natural Lolium contamination:

| cultivated crop: | winter wheat |
| --- | --- |
| stage: | commencement of tillering |
| variety: | Estrella |
| country: | Spain |
| soil: | clayey loam |

| AS | kg AS/hect. | Lolium rigidum Index | Cultivated crop yield % |
| --- | --- | --- | --- |
| I Post | 2.0 | 2 | 135 |
| II Post | 4.0 | 6 | 131 |
| Control |  | 9 | 100 |

Comments:

Surprisingly intense action with 2.0 kg of the substance according to the invention, while the comparative substance with 4.0 kg of active substance is inadequate l. Field of winter barley with natural Lolium contamination:

| cultivated crop: | winter barley |
| --- | --- |
| stage: | commencement of tillering |
| variety: | Aurora |
| country: | Spain |
| soil: | clayey loam |

| AS | kg AS/hect. | Lolium rigidum | Cultivated crop Index |
| --- | --- | --- | --- |
| I Post | 2.0 | 2 | 1 |
|  | 2.4 | 2 | 1 |
| II Post | 4.0 | 5 | 2 |
| Control |  | 9 | 1 |

Comments:

The action of subtance I with 2.0 kg AS/hectare is surprisingly good, whereas compound II with 4.0 kg is inadequate.

m. Summarising comments:

The results of field tests in monocotyledonous useful crops, carried out under practical conditions, clearly show the greatly superior action of 1-(3-chloro-4-methylphenyl)-3,3-dimethylurea (I) according to the present invention, compared with the action of the compound (II) known from prior art, namely, 1-(3-chloro-4-methoxyphenyl)-3,3-dimethylurea both in the control of gramineous weeds and in the obtainment of higher increases in yield in such cultivated crops, with substantially lower applied amounts of I than of II.

We claim:
1. A method for controlling weeds in wheat and barley cultures which comprises applying to said cultures a herbicidally effective amount of 1-(3-chloro-4-methylphenyl)-3,3-dimethylurea.
2. A method according to claim 1 in which the culture is wheat.

* * * * *

UNITED STATES PATENT OFFICE
CERTIFICATE OF CORRECTION

Patent No. 3,897,242                Dated July 29, 1975

Inventor(s) Henry Martin

It is certified that error appears in the above-identified patent and that said Letters Patent are hereby corrected as shown below:

The following should appear on the cover page:

Foreign Application Priority Data

February 13, 1968 — Switzerland — No. 2101/68
        July 11, 1968       — Switzerland — No. 10364/68

Signed and Sealed this sixteenth Day of December 1975

[SEAL]

*Attest:*

RUTH C. MASON                C. MARSHALL DANN
*Attesting Officer*                *Commissioner of Patents and Trademarks*